(12) United States Patent
Cook

(10) Patent No.: US 9,198,436 B2
(45) Date of Patent: Dec. 1, 2015

(54) BARBEQUE OVEN WITH ROTATING COOKING TRAY

(76) Inventor: William C. Cook, Linwood, NC (US)

(*) Notice: Subject to any disclaimer, the term of this patent is extended or adjusted under 35 U.S.C. 154(b) by 2261 days.

(21) Appl. No.: 11/619,044

(22) Filed: Jan. 2, 2007

(65) Prior Publication Data

US 2008/0156201 A1   Jul. 3, 2008

(51) Int. Cl.
*A21B 1/44* (2006.01)
*A47J 37/07* (2006.01)
*A47J 37/04* (2006.01)

(52) U.S. Cl.
CPC .............. *A21B 1/44* (2013.01); *A47J 37/046* (2013.01); *A47J 37/0745* (2013.01)

(58) Field of Classification Search
CPC ....... A47J 37/046; A47J 37/0745; A21B 1/44
USPC ............... 99/479, 386, 391, 393, 395, 443 R, 99/443 C; 126/338, 340, 334, 335; 219/391–411
See application file for complete search history.

(56) References Cited

U.S. PATENT DOCUMENTS

| 890,861 | A | | 6/1908 | Hogg |
| 2,920,177 | A | | 1/1960 | Brane |
| 4,154,153 | A | * | 5/1979 | Stickle ............................ 99/404 |
| 4,258,695 | A | * | 3/1981 | McCarton et al. ......... 126/375.1 |
| 4,305,329 | A | | 12/1981 | Fenoglio |
| 4,862,792 | A | | 9/1989 | Lerma, Jr. |
| 5,078,121 | A | * | 1/1992 | Ha ............................... 126/41 R |
| 5,338,922 | A | * | 8/1994 | Kim et al. ..................... 219/763 |
| 5,347,977 | A | | 9/1994 | Lehikoinen et al. |
| 5,365,918 | A | | 11/1994 | Smith et al. |
| 5,534,679 | A | | 7/1996 | Beaver, II et al. |
| 5,674,421 | A | | 10/1997 | Beaver, II et al. |
| 5,787,873 | A | | 8/1998 | Whitehouse |
| 5,796,082 | A | | 8/1998 | Kim |
| 6,039,039 | A | | 3/2000 | Pina, Jr. |
| 6,439,109 | B1 | * | 8/2002 | Rehill ........................ 99/421 R |
| 6,929,001 | B2 | | 8/2005 | Yoon |
| 2005/0160920 | A1 | | 7/2005 | Guess |

* cited by examiner

*Primary Examiner* — Tu B Hoang
*Assistant Examiner* — Kristopher Reichlen
(74) *Attorney, Agent, or Firm* — Shumaker, Loop & Kendrick, LLP

(57) ABSTRACT

A barbeque oven is provided with the capacity to cook a variety of food items. The barbeque oven of the present invention includes a cooking tray that is slideable between a first position, where the cooking tray is located substantially within the cooking chamber and the cooking tray is driven by a driving member, and a second position, where at least a portion of the cooking tray extends through an opening in the oven housing and the cooking tray is disengaged from the driving member such that the cooking tray freely rotates. As a result, unlike conventional barbeque ovens, an operator using the present invention need not bend over nor reach far to flip, rotate, or otherwise access the food items on the cooking tray.

11 Claims, 9 Drawing Sheets

BARBEQUE OVEN WITH ROTATING COOKING TRAY

FIELD OF THE INVENTION

The present invention relates to cooking ovens. Specifically, this invention relates to barbeque ovens for cooking various food items.

BACKGROUND OF THE INVENTION

Man has been cooking food over an open flame ever since the discovery of fire. Thousands of years later, people around the world still use fire to cook their food, some by necessity, because they may have no access to other means of cooking, and others by choice, believing that food cooked in such a manner takes on a unique and pleasing quality. Connoisseurs of such cooking often make an important distinction between "grilling" food and "barbequing" it. Whereas grilling involves cooking food over high heat for a short period of time, barbequing involves cooking food (almost always some type of meat or poultry) by indirect heat and over a much longer period of time.

Barbequing, it is believed, enhances the taste and texture of the food. In many parts of the United States, barbequing is considered an art. Typically, barbequing involves allowing food to cook in an oven for many hours over low heat to achieve a desired result. Although hot coals have traditionally provided a heat source for a barbeque oven, more recently, electric heating elements have been used as the main heat source, with hot coals being used to provide the traditional smell and taste of the barbequed food. In a commercial setting, such as a restaurant, an oven with a large cooking tray is often employed so that large quantities of food may be cooked at the same time to meet a high volume of customer demands. To ensure even cooking, an operator must periodically rotate or flip over each food item on the tray. This may involve opening a lid or door on the cooking oven and accessing each item to be rotated.

One typical commercial barbecue cooking oven uses a series of rectangular expanded metal cooking trays to hold food items during cooking. When the door to the cooking chamber is open, the cooking tray can slide out to an extended position to allow the oven operator to access the food. However, such an arrangement is not preferable for several reasons. As noted above, in commercial applications the expanded metal cooking tray can be quite large. The large size of the cooking tray makes it difficult for the operator to access the food when it is necessary to flip the food or retrieve the finished cooked product. Even with the tray extended out of the barbecuing oven, the operator must reach to access food items located at the back of the tray. This can force the operator to lean forward over the food, possibly resulting in unsanitary contact with the food. The extended reaching and leaning can be stressful to the operator and can also result in undesired contact with the food or tray. Additionally, an operator who is conscious of heat loss from the oven during the time the door is open is likely to attempt to perform this task as quickly as possible. This tendency for speed increases the risk of harm to the operator during the process. For example, the operator may accidentally touch the cooking tray or the walls of the oven with his hands, arms, or body.

As the cooking tray and food remain stationary during the cooking process, this may lead to additional problems. In particular, a food item may not necessarily cook evenly because it remains over one area of the heat source. As the heat source may not provide the same amount of heat in every location, certain food items may cook more quickly than others, forcing the operator to pay close attention to the food throughout the cooking process. Additionally, because the food remains stationary, if a particular food item happens to continually drip grease directly on a hot portion of the heat source, this could lead to fire flare-ups, which are a safety risk. Furthermore, a flare-up could ignite the operator's clothes or burn the operator as his body is extended over the tray.

As a result, there is a need for a barbeque oven with the capacity to cook various food items and which has a cooking tray configured to promote the even distribution of heat and provide a convenient, efficient, and safe way to access food located on all areas of the cooking tray.

BRIEF SUMMARY OF THE INVENTION

Embodiments of the present invention generally relate to a barbeque oven comprising a housing forming a cooking chamber and a rotatable cooking tray. The cooking tray may be configured to allow the barbequing of various food items and may rotate within the cooking chamber to facilitate the even cooking of the food. The cooking tray may also be slideable between a first position, in which the cooking tray is substantially within the cooking chamber, and a second position, in which a portion of the cooking tray extends through an opening the housing. In the second position, the cooking tray may be freely rotatable, allowing a barbeque oven operator to access food items on all areas of the cooking tray in a convenient, efficient, and safe manner.

The housing of the barbeque oven may define at least one opening, and a movable door may provide access to the cooking chamber through the opening of the housing. In one embodiment, an elongate track may be located within the cooking chamber and may extend along a top of the cooking chamber from the opening of the housing toward a back of the cooking chamber, farthest from the opening. The rotatable cooking tray may be mounted at its center to a slideable shaft, near a bottom end of the shaft. At least one axle may be attached near the top end of the shaft such that the axle is perpendicular to the elongate track. Rollers mounted to the axle may engage the elongate track and allow the shaft to move along the track between a first position and a second position. In some embodiments, the cooking tray may remain horizontal when sliding between the first and second positions. The barbeque oven may also include a motor that drives a driving member. The driving member may be a pinion gear.

In the first position, the cooking tray may be substantially within the cooking chamber, and the tray may be driven by the driving member. In the second position, at least a portion of the tray may extend through the opening of the housing, and the tray may be disengaged from the driving member. The driving member may be configured to engage with the cooking tray such that when the cooking tray is in the first position, the cooking tray may be rotated by the driving member. When the cooking tray is in the second position, the tray may be disengaged from the driving member and may be freely rotatable, facilitating access to all areas of the cooking tray.

The housing of the barbeque oven may define a second opening, such that the motor is located outside the cooking chamber and at least a portion of the driving member may extend through the second opening to engage the cooking tray within the chamber. The cooking tray may have a generally circular shape, and the perimeter of the cooking tray may form slots for engaging a driving member in the form of a pinion gear.

The barbeque oven may be configured such that when the cooking tray is in the first position the driving member is urged into engagement with the cooking tray. Conversely, the barbeque oven may be configured such that when the cooking tray is in the first position the cooking tray is urged into engagement with the driving member. In some embodiments, the door may have an open position and a closed position. The door may also include a biasing feature such that when the cooking tray is in the first position and the door is closed, the biasing feature urges the cooking tray to engage with the driving member.

At least a portion of the cooking chamber of the barbeque oven may be lined with soapstone in some embodiments. The soapstone may comprise a number of adjacent soapstone slats that are held in place by springing bars located on an inside perimeter of the soapstone.

In another embodiment, a method of accessing food items in a barbeque oven is also provided. The method may comprise the steps of opening a door to access a cooking chamber through an opening in a housing of the barbeque oven, sliding a cooking tray between a first position to a second position, freely rotating the cooking tray, and accessing food items located on a top surface of the cooking tray. In some embodiments, the cooking tray may remain horizontal when sliding between the first position to the second position.

In the first position, the cooking tray may be engaged with a driving member and the cooking tray may be located substantially within the cooking chamber, as described above. The driving member may be driven by a motor located outside the cooking chamber, and at least a portion of the driving member may extend through a second opening in the housing to engage the cooking tray.

In some embodiments, the driving member may be a pinion gear that engages slots that are formed along a perimeter of the cooking tray when the tray is in the first position. The driving member may be urged into engagement with the cooking tray when the cooking tray is in the first position, or the cooking tray may be urged into engagement with the driving member.

In the second position, the cooking tray may be disengaged from the driving member and at least a portion of the cooking tray may extend through the opening in the housing. When the cooking tray is freely rotated, it may be in an approximately horizontal plane about a bottom end of a shaft that is attached approximately at the center of the cooking tray. The cooking tray may be generally circular.

The door may have an open position and a closed position. A biasing feature may be located on the door such that the biasing feature urges the engagement of the cooking tray with the pinion gear when the door is in its closed position and the cooking tray is in the first position.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

Figure 1:
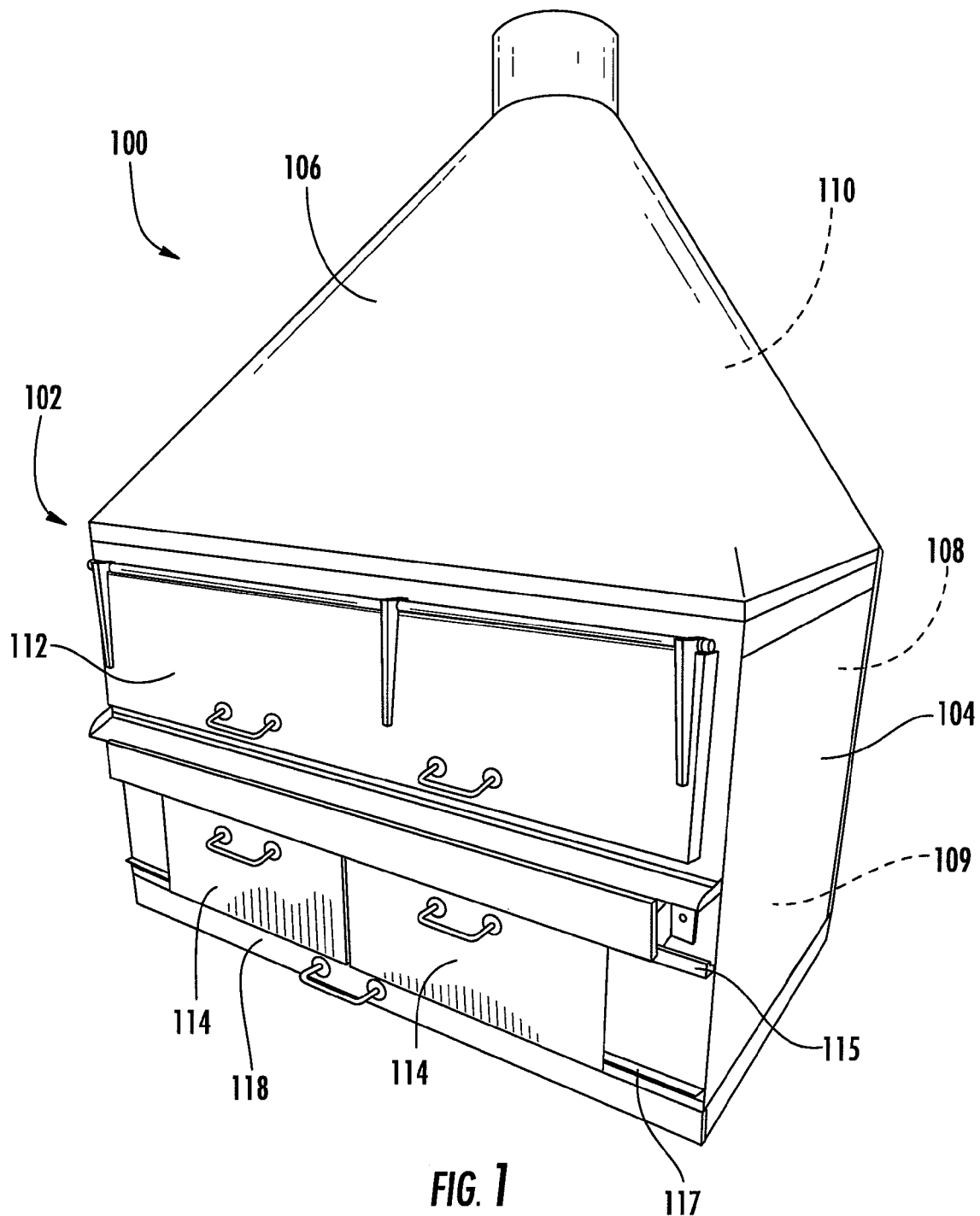
FIG. 1 is a perspective view of one embodiment of the barbeque oven showing a cooking chamber door in a closed position.

FIG. 1 illustrates a barbeque oven 100 that has the capacity to cook a variety of food items and that includes a cooking tray configured to promote the even distribution of heat and provide a convenient, efficient, and safe way to access food items cooking on all areas of the cooking tray. It should be noted that although the subsequent description and appended figures describe and show a commercial-sized barbeque oven, the present invention should not be viewed as limited to any particular size, and thus other configurations of the present invention may be possible, including, but not limited to, smaller consumer-sized configurations.

As shown in FIG. 1, the barbeque oven 100 includes a housing 102 that defines a main housing portion 104 and an exhaust portion 106. In the depicted embodiment, the housing 102 is constructed of stainless steel, however in various other embodiments the housing 102 may be constructed of any other material known to be used in the construction of ovens, including, but not limited to, other metal materials, stone, brick, ceramic, cob, refractory cement, composite materials, or combinations thereof. Additionally, various portions of the housing 102 may be constructed of different materials. For example, the main housing portion 104 may be constructed of one material, while the exhaust portion 106 may be constructed of a different material.

An exhaust chamber 110 is located within the exhaust housing 106. A cooking chamber 108 and a heating chamber 109 are located within the main housing portion 104. The exhaust chamber 110 allows exhaust smoke from the cooking process to escape from the heating and cooking chambers 108, 109. Access doors 114 are also attached to the main housing portion 104. The access doors 114 slide along upper and lower access door tracks 115, 117 so as to provide access to a heating source 113, shown in FIGS. 2 and 3. The heating source 113 includes a plurality of electric heating elements controlled by an electronic controller. The electronic controller aids in maintaining a constant temperature in the cooking chamber 108 and may also be programmable. Hot coals are also used in the depicted embodiment primarily to aid in providing a traditional smell and taste for the barbequed food. It should be noted that in other embodiments of the present invention, other heat sources may be used, including, but not limited to, gas fueled heat sources, as well as wood, hot coals, etc.

A movable cooking chamber door 112 is attached to the main housing portion 102 and provides access through an opening 116 (shown in subsequent figures) into the cooking chamber 108. The cooking chamber door 112 is a substantially flat door that rotates between a closed position, shown in FIG. 1, and an open position shown in FIG. 2. When the cooking chamber door 112 is in the open position, access is provided into the cooking chamber 108 through the first opening 116 into the main housing portion 104. Although the cooking chamber door 112 of the depicted embodiment of the present invention rotates between the closed position and the open position, in other embodiments, a cooking chamber door 112, or two or more cooking chamber doors 112, may move in other ways between a closed position and an open position to provide access into the cooking chamber 108, including, but not limited to, sliding between the two positions. For example, a cooking chamber door 112 of another embodiment may also be removable from a closed position on the main housing portion 104 to create an open position. Additionally, the cooking chamber door 112 may include at least one locking mechanism to secure the cooking chamber door 112 in an open position or a closed position. The cooking chamber door 112 of the present invention is constructed of stainless steel; however, in various other embodiments the cooking chamber door 112 may be constructed of any other material known to be used in the construction of ovens, including, but not limited to, other metal materials, stone, brick, ceramic, cob, refractory cement, composite materials, or combinations thereof.

Figure 2:
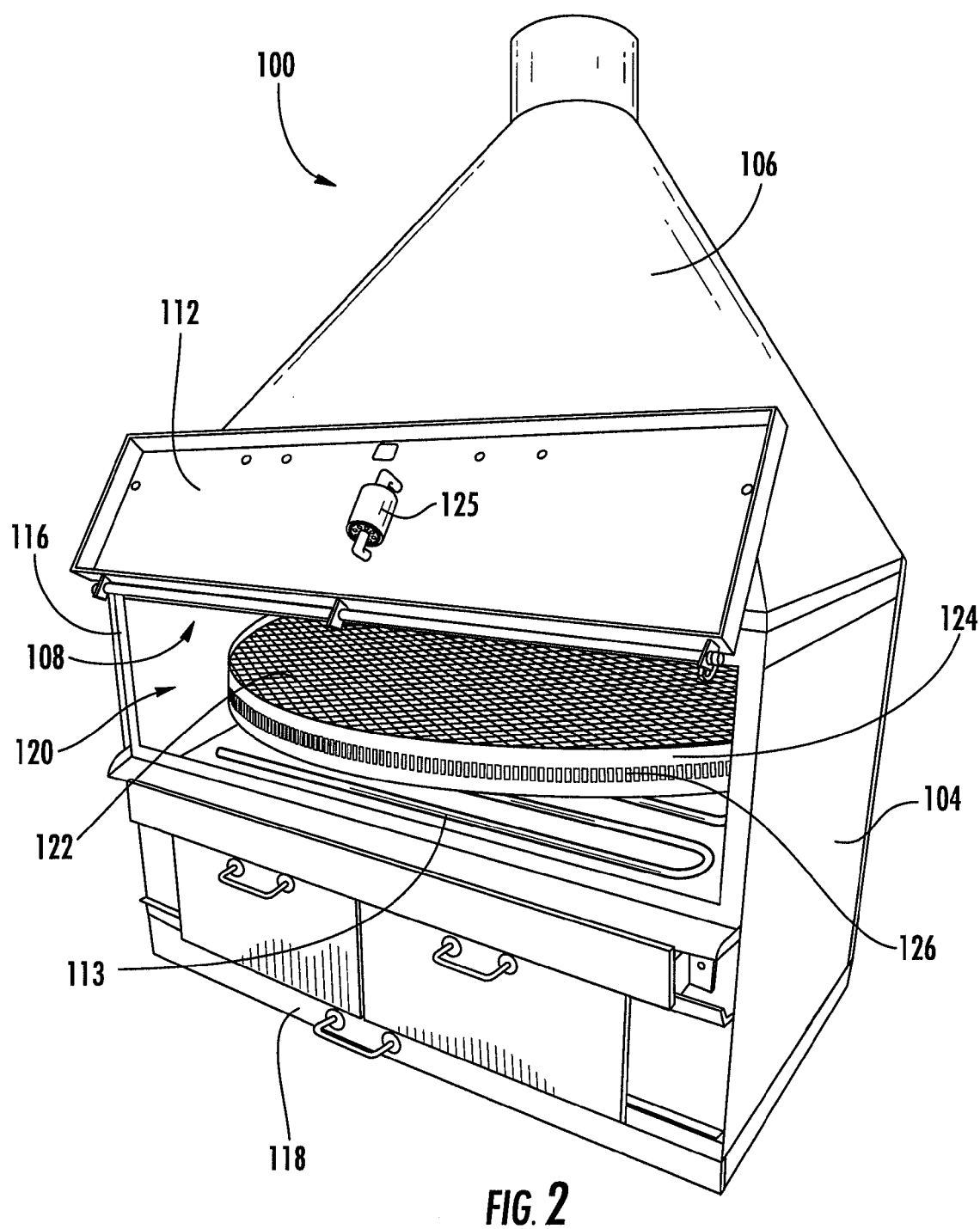
FIG. 2 is a perspective view of the barbeque oven of FIG. 1 shown with the cooking chamber door in an open position and a cooking tray in a first position.

The barbeque oven 100 may also include a grease receptacle 118, shown in FIGS. 1 and 2, for containing grease and other food drippings released from food items cooking on a cooking tray 120. The grease receptacle 118 may extend the width of the oven 100 and have a depth such that grease collecting in the receptacle 118 can remain in the receptacle 118 until properly discarded, rather than spilling out of the receptacle 118 and onto the floor. The grease receptacle 118 may be disposed proximate the bottom edge of the barbeque oven 100, as shown in the figures, or at any other location below the cooking tray 120, such as directly below the cooking tray 120. In this way, the receptacle 118 may be generally aligned with the cooking tray 120 such that the receptacle 118 may collect grease and other drippings from the food items cooking on the surface of the cooking tray 120. The grease receptacle 118 may be removable from the housing portion 104 of the barbeque oven 100, allowing the grease and drippings contained in the grease receptacle 118 to be accessed and discarded.

Referring to FIG. 2, when the cooking chamber door 112 is in the open position, the cooking tray 120 may be accessed. The cooking tray 120 is generally circular and defines a cooking surface 122 constructed of an expanded steel mesh, and a perimeter band 124 extending around the periphery of the cooking surface 122. The perimeter band 124 is also constructed of steel. Although a cooking surface 122 constructed of expanded steel mesh may facilitate even cooking by allowing heat to pass through the openings in the mesh, other configurations and materials may be used in other embodiments. For example, in various other embodiments the cooking tray may be constructed of any other material known to be used in the construction of ovens, including, but not limited to, other metal materials, ceramic materials, composite materials, or combinations thereof. Although the perimeter band 124 of the depicted embodiment is constructed of steel, it too may be constructed of another material as described above. Additionally, other embodiments may include other configurations for the cooking tray 120 and/or the cooking surface 122, including a perimeter that is integral with the cooking tray 120 and/or cooking trays and cooking surfaces that are non-circular.

Figure 3:
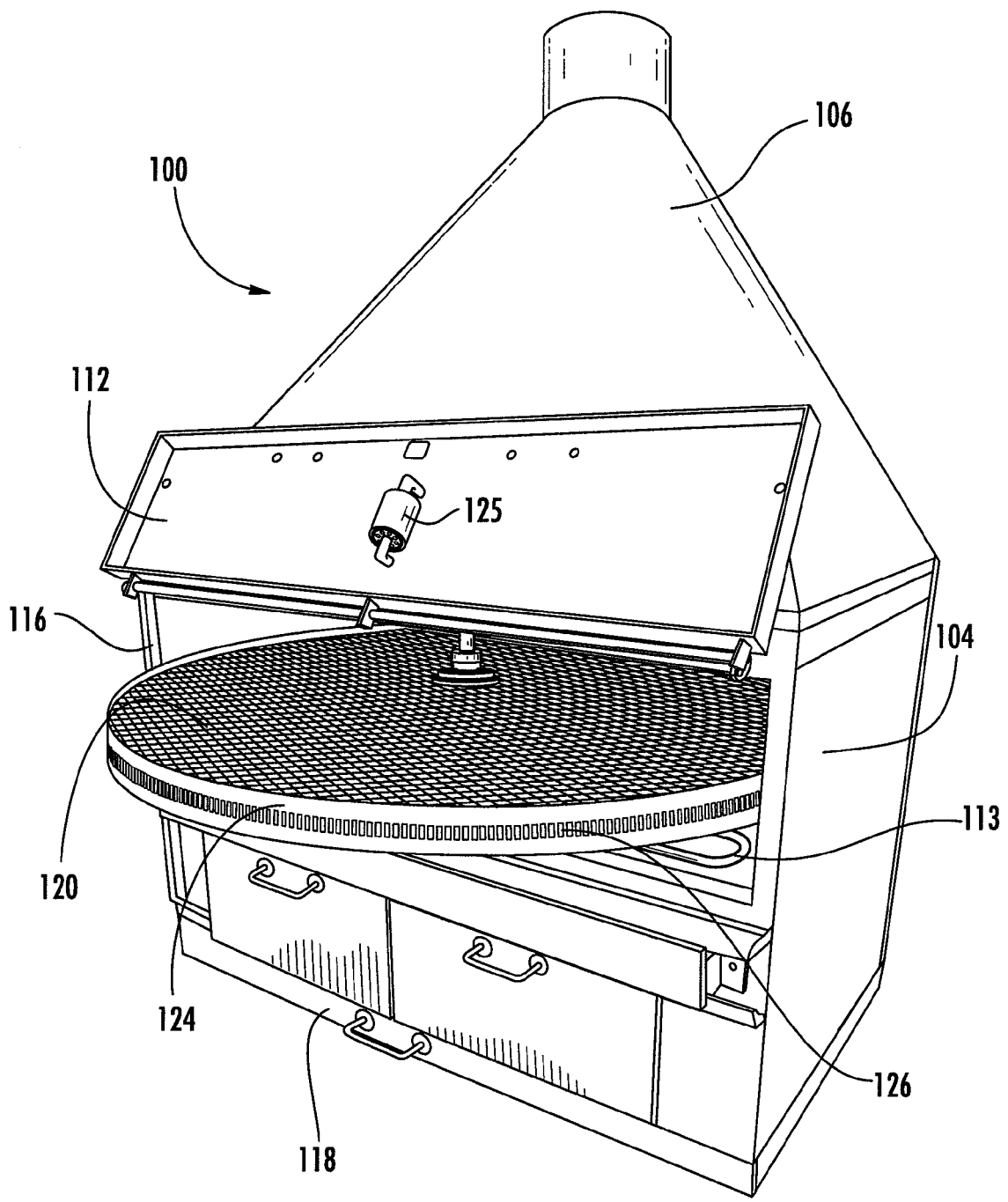
FIG. 3 is a perspective view of the barbeque oven of FIG. 1 shown with the cooking chamber door in an open position and the cooking tray in a second position.

As will be discussed in more detail below, the cooking tray 120 of the present invention is slideable between a first position, wherein the cooking tray 120 is located substantially within the cooking chamber 108 as shown in FIG. 2, and a second position, wherein at least a portion of the cooking tray 120 extends through the first opening 116 of the main housing portion 104 as shown in FIG. 3. In the first position, the cooking tray 120 is engaged with a driving member. The perimeter band 124 includes a series of slots 126 extending around the band 124. The driving member is a pinion gear 145 (shown in FIGS. 6-6A); however, in other embodiments the driving member may be a driven roller or another member engageable with the cooking tray 120. The pinion gear 145 is driven by a motor 144 (also shown in FIGS. 6-6A) in order to rotate the cooking tray 120 while the cooking tray 120 is in the first position. As further shown in FIG. 2, an idler gear 125 is springingly mounted to an inside surface of the cooking chamber door 112 such that when the door 112 is in the closed position, the idler roller 125 contacts the perimeter band 124 of the cooking tray 120 and urges the cooking tray 120 into engagement with the driving member. That is, the idler gear 125 can be biased by one or more springs toward the cooking tray 120, thereby providing a biasing feature on the cooking chamber door 112 for urging the cooking tray 120 against the pinion gear 145 when the cooking chamber door 112 is in the closed position.

Figure 4:
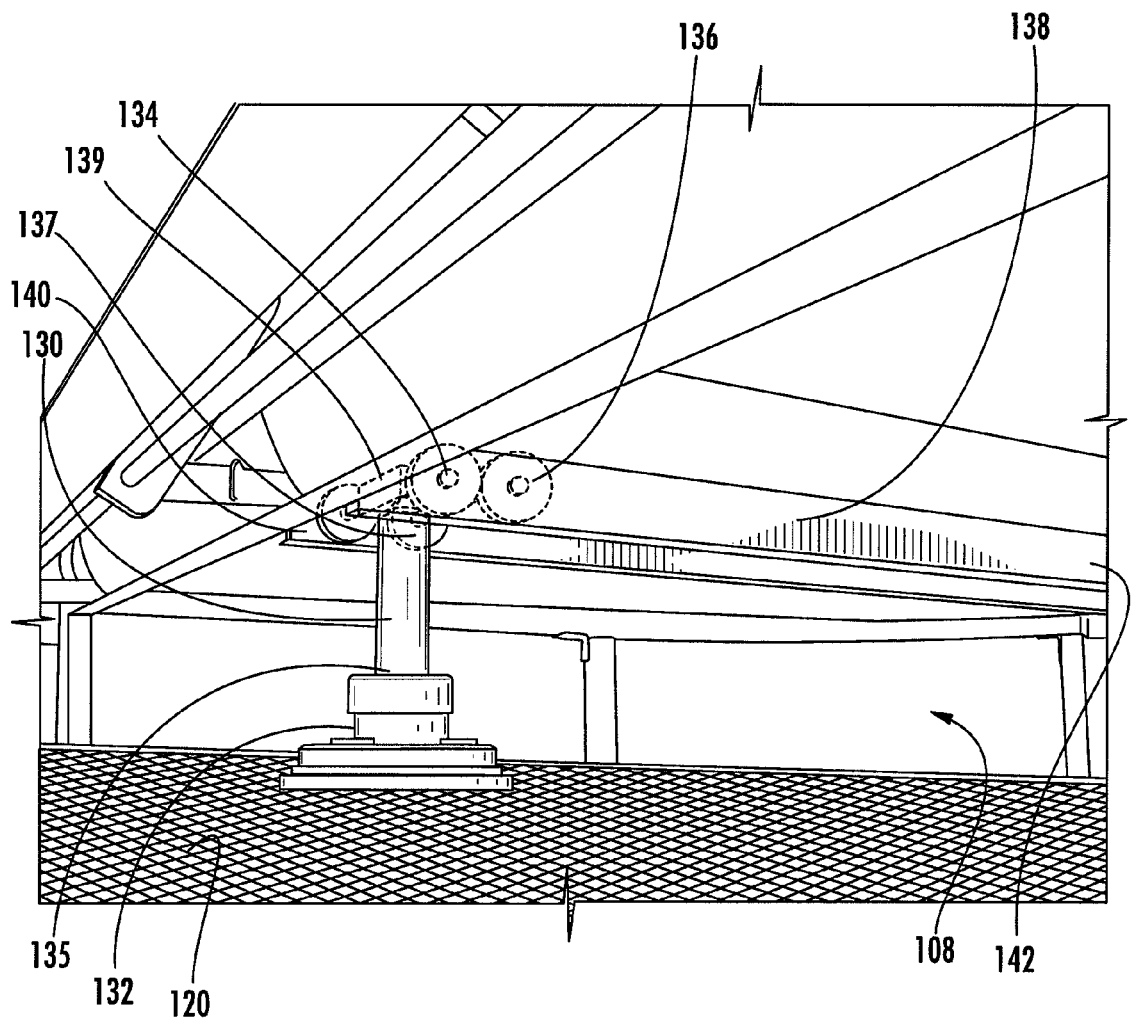
FIG. 4 is a close-up perspective view of an elongate track of the barbeque oven of FIG. 1 shown with rollers mounted to two axles that are engaged within the track.

FIG. 4 shows a detailed view of the manner in which the cooking tray 120 freely rotates in the second position. As shown in the figure, the cooking tray 120 includes a bearing feature 132 located proximate a center of the cooking tray 120. A bottom end 135 of a shaft 130 is coupled to the bearing feature 132 such that the cooking tray 120 rotates relative to the oven housing 102. In the depicted embodiment, the bearing feature 132 is attached to the cooking tray 120 such that the cooking tray 120 rotates relative to the shaft 130. The bearing feature 132 of the depicted embodiment is an axle bearing similar to one that may be used as a wheel bearing on an axle of a small trailer; however, in other embodiments the bearing feature 132 may be any feature that allows the cooking tray 120 to rotate. Additionally, in other embodiments the cooking tray 120 and the shaft 130 may rotate together about a bearing feature located proximate a top end 137 of the shaft 130.

FIG. 4 also shows a detailed view of the manner in which the cooking tray 120 is slideable between the first position and the second position. As shown in the figure, the top end 137 of the shaft 130 is attached to a mounting block 139. The mounting block 139 mounts a pair of wheel axles 134. Each wheel axle 134 includes a pair of opposite wheels 136. The wheels 136 are rotatable about each axle 134 and are mounted within an elongate track 138. The elongate track 138 is mounted proximate a top of the cooking chamber 108 and extends from a first end 140 proximate the first opening 116 of the main housing portion 104, to a second end 142 distal from the first opening 116. So configured, the cooking tray 120 is slideable from the first position to the second position in a substantially horizontal orientation. The shaft 130, the mounting block 139, the axles 134, and the wheels 136 are constructed of steel; however, in other embodiments these components may be constructed of any other material sufficient to provide the described functions and to withstand the temperature conditions inside the cooking chamber 108. It should be noted that in other embodiments, the cooking tray 120 may be slideable in various other ways as would be understood by one skilled in the art, including, but not limited to, mounting the cooking tray 120 above a elongate track 138, or sliding the cooking tray 120 using more sliding members mounted on either side of the cooking chamber 108.

Figure 5:
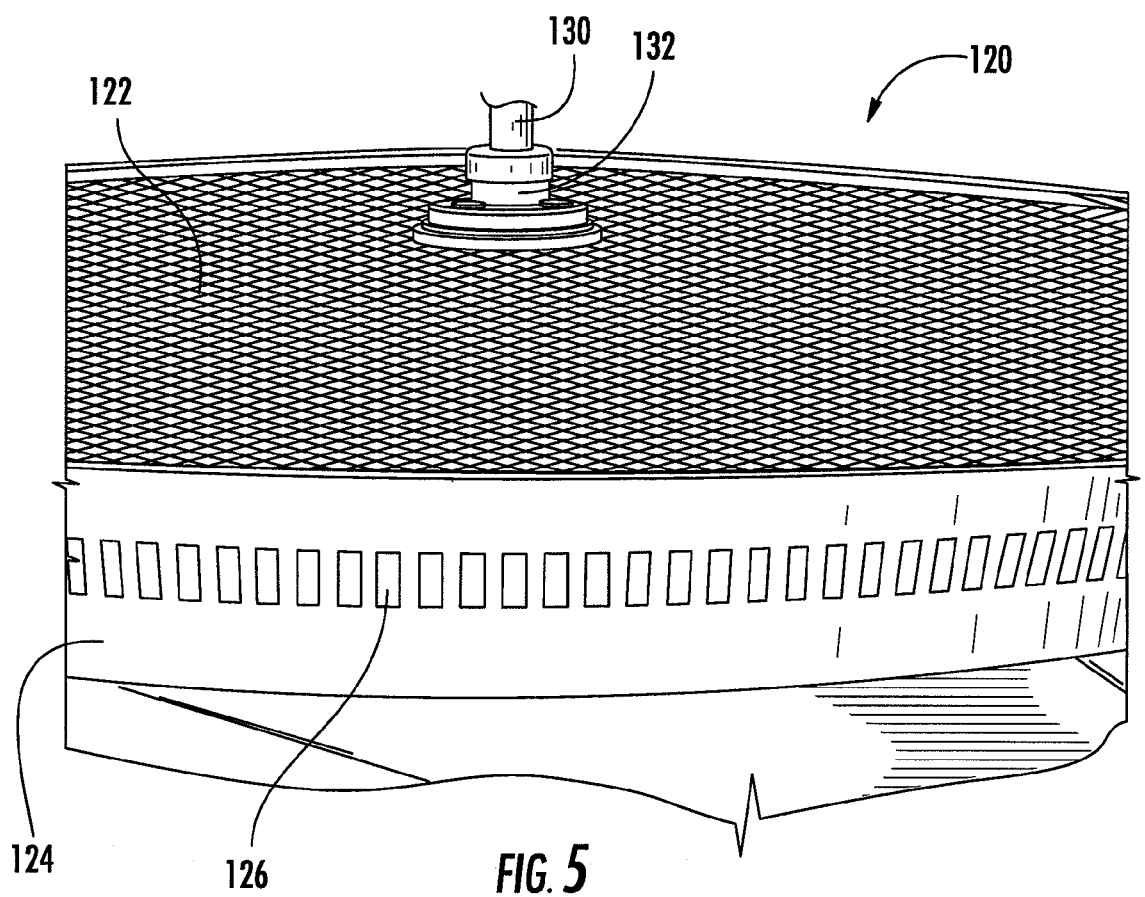
FIG. 5 is a close-up perspective view of a perimeter band of the cooking tray of the barbeque oven of FIG. 1 shown with slots formed along a perimeter band of the tray.

As shown in FIG. 5, a perimeter band 124 surrounds the cooking surface 122 of the cooking tray 120. A series of slots 126 are formed in the perimeter band 124 of the cooking tray 120. In other embodiments, the cooking tray 120 may form teeth along a perimeter of the cooking tray 120 to engage a driving member. In still other embodiments, the cooking tray 120 need not include slots or teeth to be engageable with a driving member, such as embodiments in which the driving member is a driven roller. In various other embodiments, the size, shape, and distance between the slots 126 may be configured to be compatible with a particular driving mechanism so that the cooking tray 120 rotates when the cooking tray 120 is in the first position. In certain embodiments, the inventor has determined that even heating of food items located on the cooking surface 122 of the cooking tray 120 is further facilitated by using slots 126 that are integrated into the cooking tray 120 and that are configured to engage a driving mechanism. So configured, the slots 126 complement the expanded metal configuration of the cooking surface 122, allowing heat to travel through the open areas created by both the expanded metal mesh of the cooking surface 122, as well as the slots 126. Although the slots 126 may be formed in any known manner, the slots 126 are generally rectangular in shape and are formed by laser cutting a series of rectangular cutouts into an elongate strip of steel. The strip of steel is then formed into a generally circular shape to create the perimeter band 124. The perimeter band 124 is then attached, such as by welding, around an outer portion of the cooking surface 122 to create the cooking tray 120. In other embodiments, the cooking tray 120 need not include a perimeter band 124, as the cooking tray 120 may be driven in another manner, such as through frictional contact with a driven roller. The cooking tray 120 may also be driven through a feature mounted to the shaft 130, such as a gear ring, so that the feature is engageable with a driving member to rotate the cooking tray 120 when the cooking tray 120 is in the first position. In this and other embodiments, the driving member may be located within the cooking chamber 108.

As noted, the cooking tray 120 is configured to rotate when the cooking tray 120 is in the first position. In this manner, any food items located on the cooking surface 122 of the cooking tray 120 may rotate through a variety of positions relative to the heating source 113 while the cooking tray 120 is rotated and thus the food items may receive more consistent heating. Additionally, certain foods that are commonly used for barbequing, such as meat items, including pork products, comprise a large percentage of fat. When fat cooks for an extended period of time, it creates grease which tends to drip down from the food items. Advantageously, rotating the cooking tray 120 can reduce the possibility of flare-ups by preventing the food items from remaining stationary, which in turn prevents grease from continually dripping on the same spot of the heat source.

Figure 6:
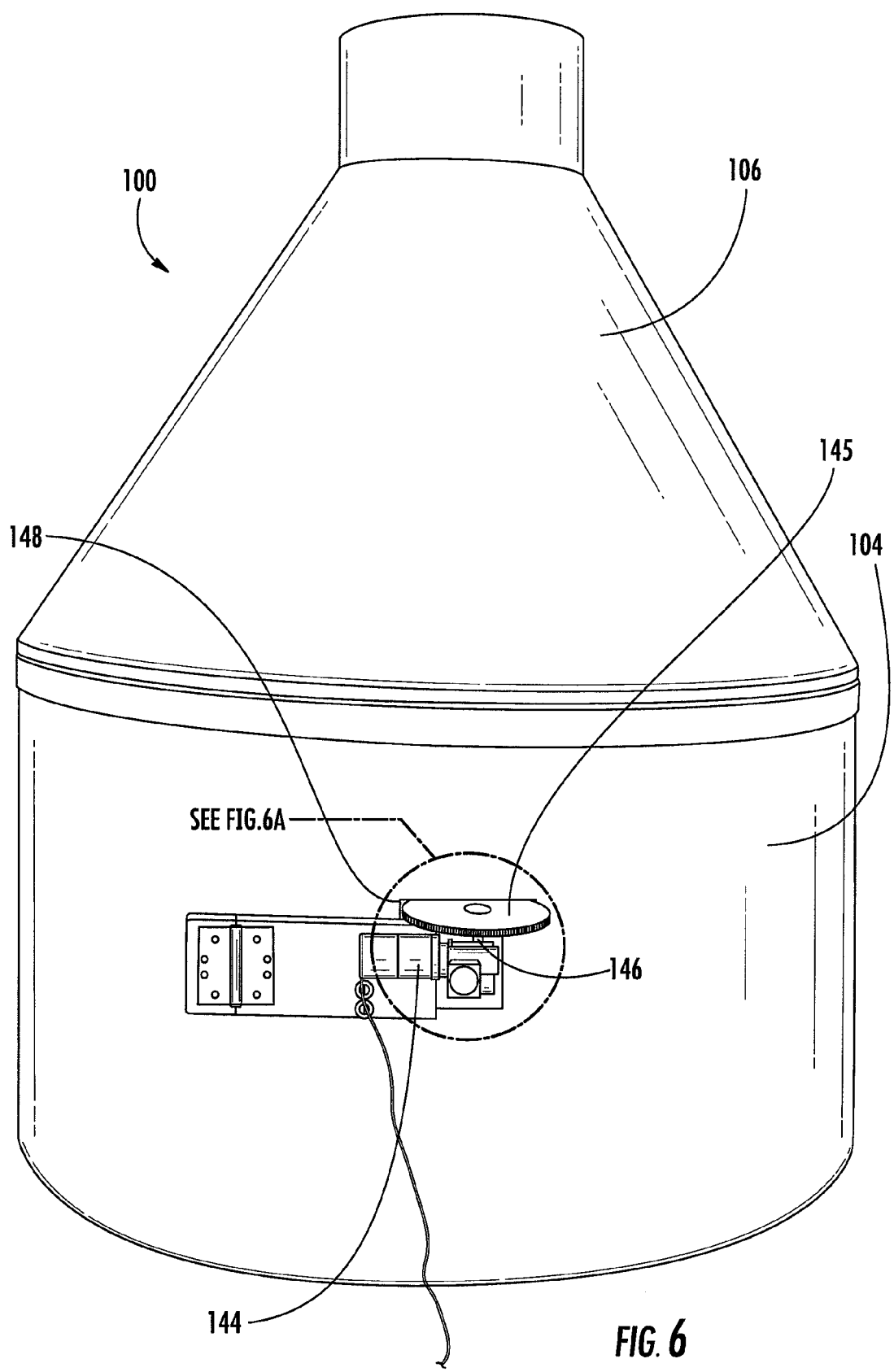
FIG. 6 is a perspective view of the rear side of the barbeque oven of FIG. 1 shown with a motor and a pinion gear extending through a second opening of the cooking chamber.
Figure 6A:
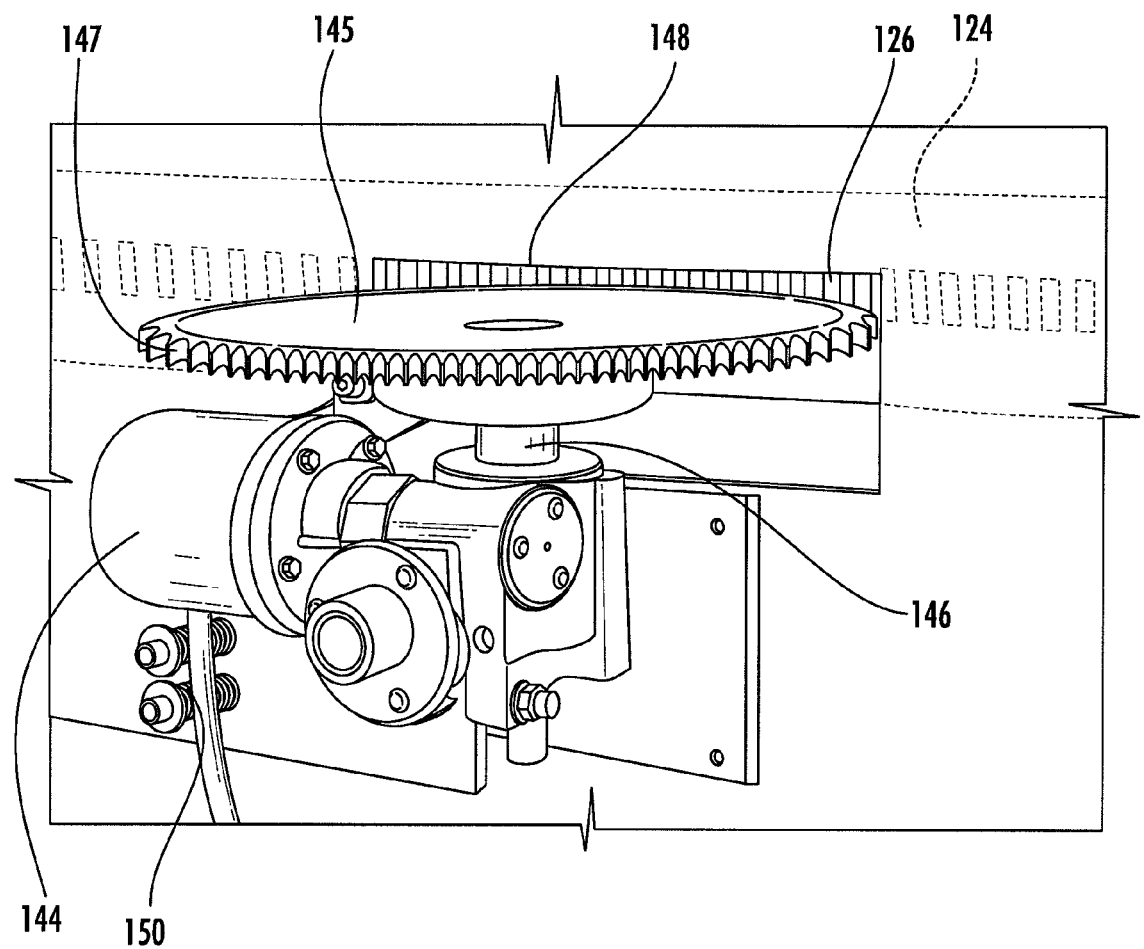
FIG. 6A is a detail perspective view of the motor and pinion gear of FIG. 6 showing the engagement of the pinion gear with the cooking tray through the second opening.

FIGS. 6 and 6A show the manner in which the cooking tray 120 is rotated while the cooking tray 120 is located in the first position. As shown in the figures, a motor 144 is mounted to the outside of the main housing portion 104 of the oven 100. A pinion gear 145 is rotatably mounted to a shaft 146 of the motor 144 such that the motor 144 drives the pinion gear 145 through a pair of bevel gears (not shown). At least a portion of the pinion gear 145 extends through a second opening 148 located in the main housing portion 104 of the oven 100 such that a plurality of teeth 147 of the pinion gear 145 engage the slots 126 of the cooking tray 120. As a result, as the motor 144 drives the pinion gear 145, the teeth 147 of the pinion gear 145 successively engage the slots 126 of the cooking tray 120 such that the pinion gear 145 drivingly rotates the cooking tray 120 when the cooking tray 120 is in the first position. As also shown in FIG. 6A, a bias feature 150 is included in the depicted embodiment that is configured to urge the pinion gear 145 into engagement with the cooking tray 120. In such a manner, and as is similarly the case with the idler roller 125, inconsistencies in either or both the pinion gear 145 or the cooking tray 120 may be compensated. The pinion gear 145 can be biased toward the cooking tray 120 by other mechanisms. For example, in some cases, the motor 144 can be rotatably mounted so that the weight of the motor 144 tends to push the motor 144 and pinion gear 145 toward the cooking tray 120.

It should be noted that although the depicted embodiment of the present invention transmits the rotary motion from the motor 144 through a pair of bevel gears, other embodiments need not include bevel gears. For example, a pinion gear 145 may be mounted directly to the motor 144. Alternatively, in other embodiments, a train of gears may be used to transmit rotary motion from the motor 144 to the cooking tray 120. The configuration of the gear train may depend on a particular requirement of an application. The motor 144 may be a DC motor; however, in other embodiments the motor 144 may be any motor configured to rotate the cooking tray 120, while the cooking tray is in the first position, including, but not limited to, AC motors, stepper motors, etc. It should also be noted that in various embodiments, the rate of rotation of the motor 144, and hence the rate of rotation of the cooking tray 120 when the cooking tray 120 is in the first position, may be adjusted to suit any particular cooking application.

Figure 7:
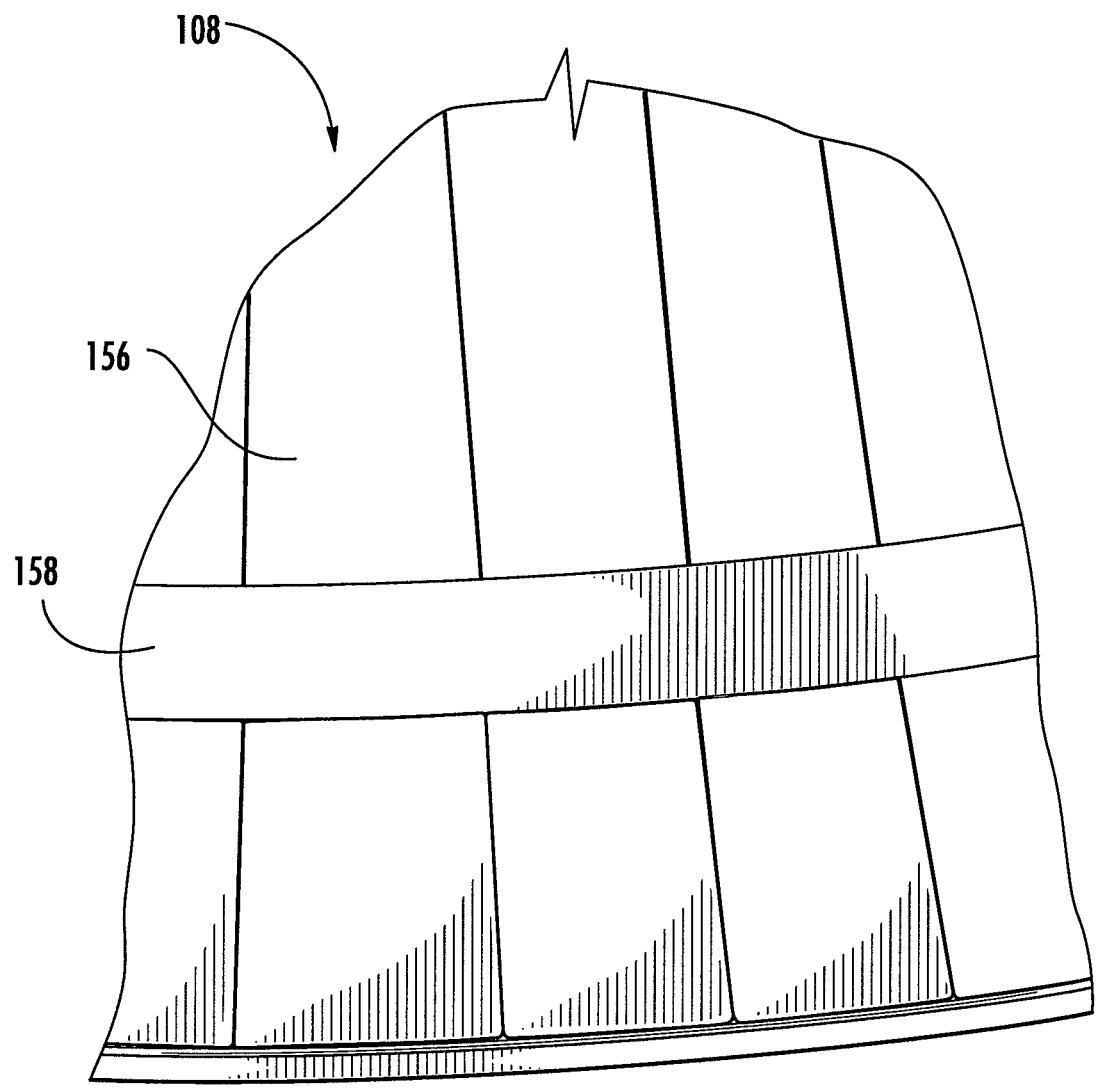
FIG. 7 is a close-up perspective view of an inner wall of a cooking chamber of the barbeque oven of FIG. 1 shown with a soapstone lining.

In order to further promote even heating and to enhance the flavor of the food items cooked in the barbeque oven 100, the cooking chamber 108 is lined with soapstone. Although not intending to be bound by any particular theory, it is believed that soapstone absorbs and evenly distributes heat within the cooking chamber 108. Referring to FIG. 7, a series of soapstone slats 156 are placed in an abutting relationship in order to line the cooking chamber 108. One or more springing bars 158 are placed on an interior perimeter of the soapstone slats 158 in order to hold the slats 158 in place. It should be noted that in other embodiments, an interior surface of the cooking chamber door 112 may also include a soapstone lining. In various other embodiments, the cooking chamber 108 may be lined with larger sections of soapstone or other similar materials in order to promote even heating and to enhance the flavor of the food items. The soapstone slats 158 can absorb thermal energy from the heating source 113 and then provide a relatively constant and uniform heat to the chamber 108.

Figure 8:
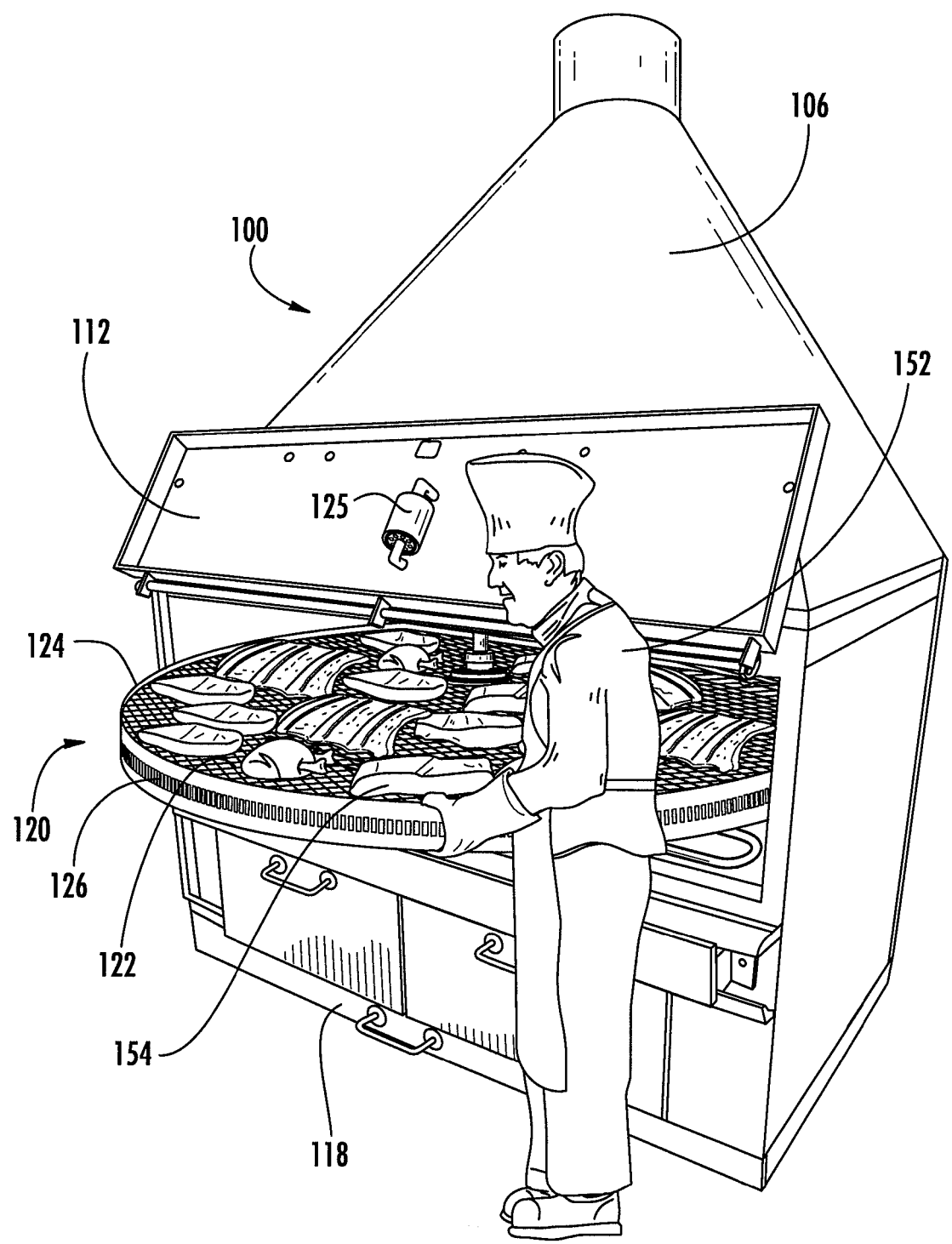
FIG. 8 is a perspective view of the barbeque oven of FIG. 1 shown with the cooking chamber door in the open position, the cooking tray in the second position, and an operator of the barbeque oven accessing food items on a cooking surface of the cooking tray.

As noted above, the cooking tray 120 is slideable between a first position, where the cooking tray 120 is located substantially within the cooking chamber 108 and the cooking tray 120 is driven by the pinion gear 145, and a second position, where at least a portion of the cooking tray 120 extends through the opening 116 and the cooking tray 120 is disengaged from the pinion gear 145 such that the cooking tray 120 freely rotates. FIG. 8 shows the advantageous nature of this aspect of the invention. To promote even cooking during barbequing, it is often the case that an operator 152 must periodically rotate or flip over each food item 154 cooking in the oven 100. The cooking tray 120 is configured such that a portion of the cooking tray 120 is located within the cooking chamber 108 and continues to receive heat from the heat source even when the cooking chamber door 112 is open and the cooking tray 120 is in the second position. Thus heat loss from food items 154 located on the portion of the cooking tray 120 located within the cooking chamber 108 is reduced, and the food items 154 within the cooking chamber 108 continue to cook while an operator 152 is accessing food items 154 from the exposed portions of the cooking tray 120.

Whereas a typical barbeque oven that uses a series of rectangular cooking trays requires an operator to slide out each tray to an extended position, and to bend and reach across the tray to access the food items, FIG. 8 shows an operator 152 easily accessing all of the food items 154 on the cooking tray by opening the cooking chamber door 112 and sliding the cooking tray 120 from the first position to the second position. Once in the second position, the operator 152 may easily reach the food items 154 located on the areas of the cooking surface 122 that extend through the opening 116 of the main housing portion 104. As shown in the figure, the operator 152 may easily rotate the freely rotating cooking tray 120 about its center in order to access the remaining food items 154. The operator 152 may grasp the perimeter band 124 of the cooking tray 120 with a gloved hand in order to rotate the cooking tray 120; however, in other embodiments the cooking tray 120 may include a series of handles or other features to facilitate rotating the cooking tray 120. Additionally, the operator 152 may use a tool or other common implement to facilitate rotating the cooking tray 120. As a result, an operator 152 need not bend over nor reach far to flip, rotate, or otherwise access food items 154 on the cooking surface 122 of the cooking tray 120. Thus, in addition to other advantages described and inherent herein, various embodiments of the present invention also help to avoid unsanitary contact with the food items 154 and to reduce the risk of harm to an operator 154 during the cooking process, for example by reducing back problems resulting from extended reaching and leaning and by reducing unintended contact with the food items 154.

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A barbeque oven comprising:
   a housing defining a cooking chamber and at least a first opening;
   at least one movable door for providing access through the first opening;
   a rotatable cooking tray to support food items disposed in contact with the rotatable cooking tray for cooking responsive to operation of the barbeque oven, the rotatable cooking tray being mounted at its center proximate a bottom end of a slideable shaft, the bottom end of the shaft engaging the cooking tray via a bearing feature disposed at the bottom end of the shaft and proximate to a center of a surface of the cooking tray, the cooking tray rotating about the bearing feature and extending outwardly from a periphery of the bearing feature;
   an elongate track entirely located within the cooking chamber proximate a top of the cooking chamber such that a first end of the track is disposed at a first location proximate the first opening and a second end of the track is disposed at a second location distal from the first opening, the track holding the cooking tray completely within the cooking chamber responsive to the shaft being disposed at the second location, the track holding the cooking tray such that more than half of the cooking tray is disposed within the cooking chamber and remaining portions of the cooking tray extend through the first opening responsive to the shaft being disposed at the first location and within the cooking chamber;
   at least one axle attached proximate a top end of the shaft and mounted perpendicular to the elongate track;
   a plurality of rollers mounted to the axle within the elongate track and rollingly engaged with the track;
   a motor; and
   a driving member driven by the motor and engageable with the cooking tray;
   wherein the cooking tray is slideable between the first and second locations, the cooking tray being driven by the driving member to cause rotation of the cooking tray about an axis of rotation defined by the shaft at the second location and the cooking tray being disengaged from the driving member such that the cooking tray freely rotates at the first location.

2. The barbeque oven of claim 1, wherein housing defines a second opening, wherein the motor is located outside the cooking chamber, and wherein at least a portion of the driving member extends through the second opening to engage the cooking tray.

3. The barbeque oven of claim 1, wherein the cooking tray is generally circular.

4. The barbeque oven of claim 1, wherein the driving member comprises a pinion gear.

5. The barbeque oven of claim 4, wherein the cooking tray is generally circular and defines slots along a perimeter of the cooking tray, and wherein the slots are engageable with the pinion gear.

6. The barbeque oven of claim 1, wherein at least one of the driving member or the cooking tray is urged into engagement with the other when the cooking tray is in the first position.

7. The barbeque oven of claim 6, wherein the door has an open position and a closed position, and wherein a biasing feature is located on the door such that the biasing feature urges the engagement of the cooking tray with the driving member when the cooking tray is in the first position and the door is in the closed position.

8. The barbeque oven of claim 1, wherein at least a portion of the cooking chamber is lined with soapstone.

9. The barbeque oven of claim 8, wherein the soapstone comprises a plurality of adjacent soapstone slats, and wherein the soapstone slats are held in place by springing bars located on an inside perimeter of the soapstone.

10. The barbeque oven of claim 1, wherein the cooking tray is configured to remain horizontal when sliding from the first position to the second position.

11. The barbeque oven of claim 1, further comprising an electric heat source and a hot coal heat source,
    wherein the hot coal heat source is positioned below the electric heat source.

* * * * *